United States Patent [19]

Malloy

[11] Patent Number: 5,301,783
[45] Date of Patent: Apr. 12, 1994

[54] DUAL PRESSURE ACCUMULATOR

[75] Inventor: John D. Malloy, Troy, Mich.

[73] Assignee: General Motors Corporation, Detroit, Mich.

[21] Appl. No.: 903,403

[22] Filed: Jun. 24, 1992

[51] Int. Cl.⁵ .................................... F16D 25/14
[52] U.S. Cl. ......................... 192/85 R; 192/109 F; 138/31
[58] Field of Search ............... 192/109 F, 85 R; 138/31

[56] References Cited

U.S. PATENT DOCUMENTS 3,674,121  7/1972  Copeland ............... 192/109 F X
3,703,228  11/1972  Chana .................. 192/109 F X
4,840,263  6/1989  Kato et al. ............. 192/109 F
5,035,312  7/1991  Asayama et al. ......... 192/109 F X
5,040,653  8/1991  Vukovich et al. ........ 192/109 F X

FOREIGN PATENT DOCUMENTS 339328  11/1989  European Pat. Off. ...... 192/109 F

Primary Examiner—Richard M. Lorence
Attorney, Agent, or Firm—Donald F. Scherer

[57] ABSTRACT

An accumulator disposed in an actuating circuit for a fluid operated friction device provides a first time pressure relation during engagement of the device and a second time pressure relation during disengagement of the device.

3 Claims, 2 Drawing Sheets 5,301,783

DUAL PRESSURE ACCUMULATOR

BACKGROUND OF THE INVENTION

This invention relates to shift timing controls in automatic shifting power transmissions, and more particularly, to shift timing controls in such transmissions wherein a fluid operated friction device is responsive to a pressure time relationship during engagement and disengagement.

In prior art transmissions, an accumulator is utilized to provide for the proper pressure time interval during a speed change to provide the least disturbance during a shift transient. The accumulators have historically been utilized only to control the on-coming friction device, which is generally a disc type fluid operated structure. The off-going friction device is generally permitted to freely exhaust, and the accumulator control is usually removed from the exhausting circuit and exhausted either separately or through a separate restricted passage, such that the accumulator has no affect on the off-going device.

These systems would let the engine accelerate freely to the new speed requirement for the on-coming gearing ratio. If the ratio interchange or transition is made onto a freewheeler rather than a friction device, the shift timing will be correct and the shift quality will be fairly smooth. However, it would be more economical if the off-going friction member could be controlled or otherwise modulated at a desired disengagement rate during the ratio interchange. This is particularly important in what is known as a clutch-to-clutch type shift where time is required and some action has to be taken to apply the on-coming clutch at synchronization while releasing the off-going clutch.

To obtain satisfactory shift quality, it has been proposed that pulse width modulated solenoid valves be utilized to control both the on-coming and off-going clutch or friction devices. This requires sufficient electronic control and ECU capabilities to permit the independent control of the pressure at each friction device. While these devices do provide for good shift quality, they also increase the cost of the transmission control. It would be advantageous if a friction device could be accompanied by an accumulator which would function in both the on-coming and off-going states during ratio interchanges.

SUMMARY OF THE INVENTION

The present invention provides an accumulator within the clutch actuation circuit which will provide a pressure time relationship during engagement and disengagement which is useful in controlling the quality of the shift during the ratio interchange. The accumulation effect during engagement and disengagement is accomplished by changing the effective area of the accumulator that is sensitive to the clutch pressure between the upshift and downshift interchanges. The area utilized during these two conditions, has a ratio which is substantially equal to the ratio of the on-coming and off-going speed ratios.

In the preferred embodiment of the invention, this is accomplished by utilizing one area during clutch engagement and both that area and a second area during clutch disengagement. This can be accomplished by exhausting the secondary area during clutch upshifting and then interconnecting the two areas during downshifting. This area interconnection can be accomplished during the shift valve which is already available to provide pressure direction to and from the friction device during ratio interchange.

It is therefore an object of this invention to provide an improved clutch engagement control wherein a single accumulator is operable to control the rate of change of pressure at the clutch piston during both engagement and disengagement.

It is another object of this invention to provide an improved accumulator and control for a friction torque device wherein a first accumulator chamber is pressurized and filled during the engagement cycle of the friction torque device and both the first chamber and the second chamber are pressurized and emptied during the disengagement cycle of the friction device.

It is a further object of this invention to provide an improved accumulator and control, as previously described, wherein a bias pressure acts in a bias chamber in opposition to the first and second chambers, and also wherein a spring member is disposed in one of the first and second chambers for exerting a force in opposition to the pressure in the bias chamber.

It is a still further object of this invention to provide an improved accumulator and control for a torque transmitting friction device, wherein a first area is pressurized during engagement, the first and a second area pressurized during disengagement, and wherein the ratio of the first area to the sum of the first and second areas is substantially equal to the ratio of the off-going gear ratio to the on-coming gear ratio.

These and other objects and advantages will be more apparent from the following specification and drawings.

DESCRIPTION OF THE PREFERRED EMBODIMENT

Figure 1:
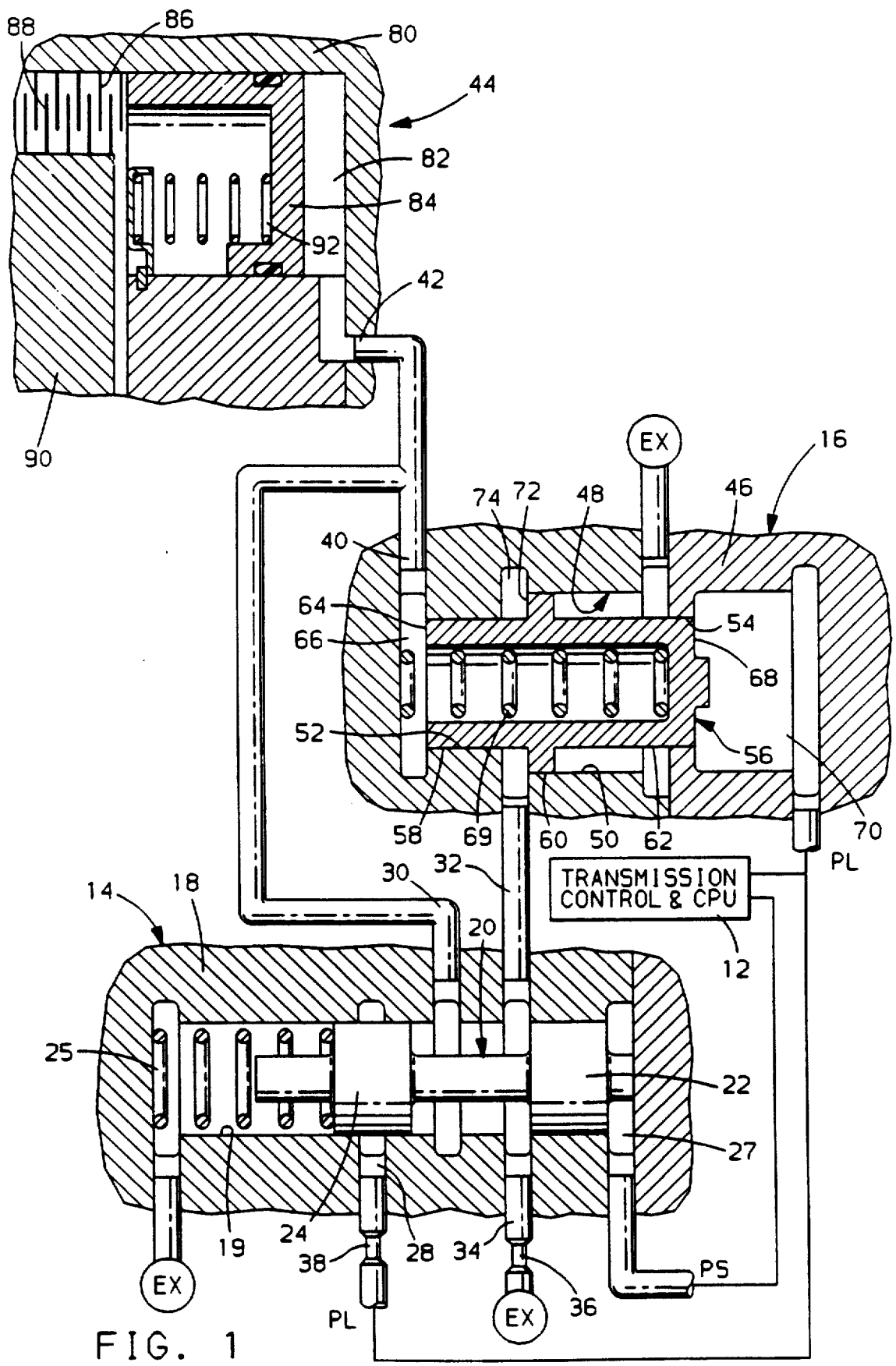
FIG. 1 is a diagrammatic representation of a portion of a transmission control circuit and a fluid operated friction device incorporating the present invention.

Referring to FIG. 1, there is seen a diagrammatic representation of a portion of a transmission control including a main control box or portion 12 which houses a control pump, a plurality of conventional control valving, such as shift valves and timing valves, and is controlled by an electronically programmed CPU. The transmission control 12 has a pair of output pressure lines, one of which is pressurized at a line pressure value (PL) and the other of which is controlled to be pressurized to establish a shift control pressure (PS).

The transmission control 12 is connectible to a shift valve 14 through the shift control pressure PS and to an accumulator 16 through the line pressure PL. The line pressure PL is also connected with the shift valve 14.

The shift valve 14 includes a valve body 18 in which is formed a valve bore 19. A valve spool 20, having spaced lands 22 and 24, is slidably disposed in the valve bore 19 and urged to one end thereof by a spring member 25. The valve land 22 cooperates with the bore 19 to form a shift control chamber 27, which is disposed in fluid communication with the shift control pressure PS. In the spring set or downshifted position shown, the valve land 22 effectively closes the line pressure passage at a port 28, while the space between lands 22 and 24 opens a clutch passage 30 and a downshift accumulator passage 32 to an exhaust port 34, which is connected through a restriction 36 to the transmission sump, not shown.

When the chamber 27 is exposed to shift pressure PS by the control 12, the valve spool 20 will move leftward against the spring 25 until the port 28 is in fluid communication with passage 30, and the passage 32 is blocked from fluid communication with the passage 30 by the land 22. This is the upshifted or pressure set condition of the valve 14. When this condition occurs, line pressure PL is directed through a restriction 38 to the port 28 and thence to the passage 30, which is in fluid communication with a upshift port 40 on the accumulator 16 and to a clutch inlet or control port 42, which is formed in a conventional fluid operated friction device 44.

The accumulator 16 includes a body portion 46 in which is formed a multi-stepped bore 48. The bore 48 has a large diameter bore portion 50 and two smaller diameter bore portions 52 and 54. The diameter portion 52 is preferably larger than the diameter 54. An accumulator piston 56 is slidably disposed in the bore 48 and has three diameter portions 58, 60 and 62, which are respectively slidably engaged with the bores 52, 50 and 54.

The piston 56 has one end 64 which cooperates with one end of bore 48 to form an upshift chamber 66, a second end 68 which cooperates with the other end of valve bore 48 to form a bias chamber 70 and an intermediate differential area 72 formed by the diameters 60 and 58, and cooperating with the bore 48 to form a downshift bias chamber 74. The upshift chamber 66 is in fluid communication with the passage 30 and the downshift chamber 74 is in fluid communication with the passage 32. The accumulator 16 also includes a spring member 69 which is disposed between one end of bore 48 and the piston 56. The spring 69 imposes a force on the piston 56 in a direction to overcome fluid pressure in the chamber 70 and therefore urge the accumulator piston 56 to the right.

As is evident from the drawing, when the shift valve 14 is in the downshifted position, the chambers 66 and 74 will be interconnected between the lands 22 and 24, and in the upshifted position, the port 28 and passage 30 will be in fluid communication with the upshift chamber 66, while the downshift chamber 74 will be connected to exhaust 34.

The fluid operated friction device 44 is a disc type device having a housing 80 in which is formed an annular chamber 82 which slidably supports an annular piston 84. The chamber 82 is in fluid communication through port 42 with the passage 30. The friction device 44 includes a plurality of conventional friction discs 86 which are splined in a well known manner to the housing 80, and a plurality of friction discs 88 which are splined in a well known manner to an output hub 90.

As is well known, the output hub 90 is generally connected to a gear member in a planetary gear arrangement or in an automatic shifting type countershaft transmission. The housing 80 is generally either a rotating member connected to a transmission input shaft or a stationary member connected to the transmission housing.

The friction device 44 can therefore be a clutch or a brake, however, in control terminology, the disc type device is generally referred to as a clutch during a discussion of a ratio interchange, such that the interchange between disc type friction devices is termed a clutch-to-clutch shift by the engineering community. When the chamber 82 is pressurized, the piston 84 will move against a plurality of return springs 92 until the friction discs 86 and 88 are urged into frictional abutment. During this portion of the piston movement, there is no work being accomplished or torque transmitting reaction being established by the friction device 44. This is generally known as the clutch takeup time in which the return springs are compressed to permit the beginning of clutch engagement.

Figure 2:
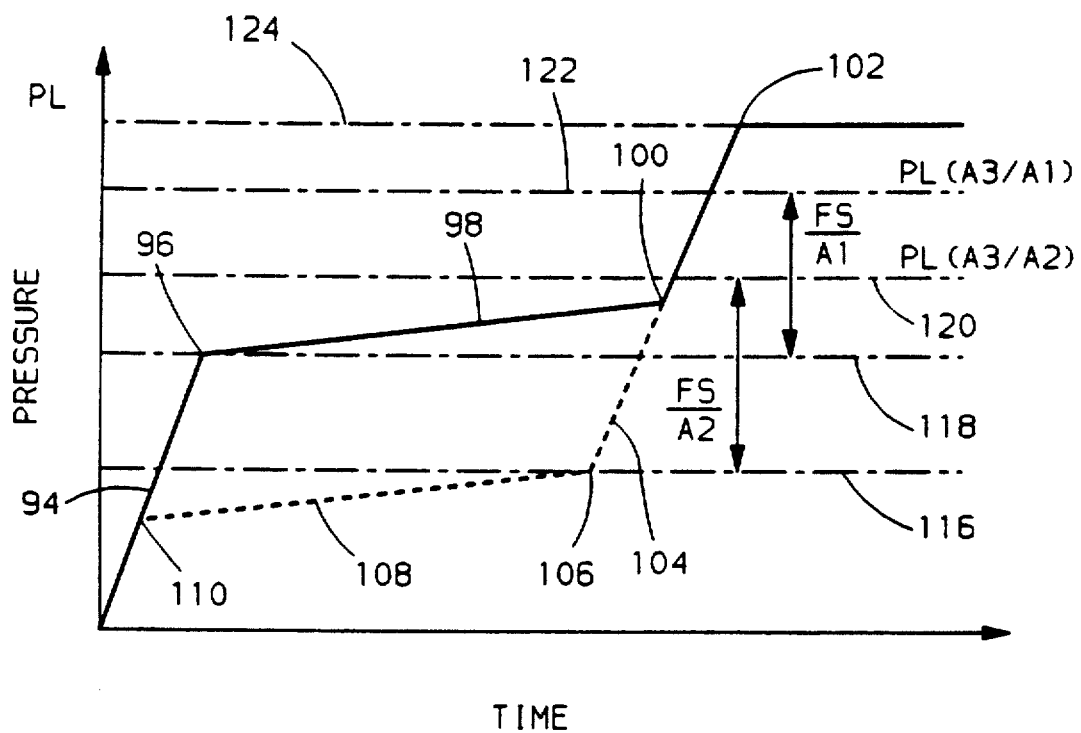
FIG. 2 is a curve describing the pressure time relationship in the friction device during a ratio change in both the on-coming condition and the off-going condition.

The pressure in passage 30 will increase along the line 94 shown in FIG. 2 until the point 96 is reached. At the point 96 on the curve, the pressure is sufficient in the chamber 66, along with the cooperation of spring 69, to overcome the pressure in bias chamber 70 and start the piston 56 to stroke rightward. While the accumulator piston 56 is stroking, and the chamber 66 is increasing in size, the pressure rise in the passage 30 and therefore in chamber 82 will be delayed, as represented by the line 98 in the pressure time curve of FIG. 2.

During this time, the accumulator is being filled and the clutch is being engaged under a slipping condition until sufficient clutch capacity is attained to carry the fill torque of the on-coming ratio. When the accumulator piston 56 is fully stroked, the point 100 will be reached, and a rapid increase in the pressure in chamber 82 will occur until line pressure is achieved at point 102. Thus, the upshift pressure of the on-coming friction device is controlled in a fairly conventional accumulator assisted manner.

When a downshift or ratio change interchange is required by the transmission control 12, the friction device 44 will be disengaged while another friction device within the transmission is being engaged. In the prior art accumulator assisted controls, it would be common to simply exhaust the accumulator through a large restriction thereby effectively removing it as a timing device, or by separately exhausting the accumulator, which again removes the timing device. The present invention, however, utilizes the accumulator function during a ratio interchange while the friction device 44 is being disengaged.

When a shift disengaging the device 44 is signaled by the shift valve 14, that is the valve is moved to the spring set position shown, the pressure in chamber 82 rapidly decreases along line 104 to the point 106. At this point, the pressure in chamber 74 and in chamber 66 along with the force of spring 69, are at a level where the fluid pressure in the bias chamber 70 will begin stroking the piston 56 leftward. Thus, the additional fluid which must be exhausted through the valve 14, as represented by the chambers 74 and 66, will cause the pressure time relationship to pass along the line 108 of FIG. 2. The slope of the line is controlled by the bias pressure and the size of the restriction 36.

When the accumulator has stroked sufficiently to exhaust the chambers 74 and 66, the point 110 will be reached in FIG. 2, after which the pressure in the chamber 82 will rapidly reduce along the line 94.

FIG. 2 has a plurality of lines, shown mostly in phantom, which are parallel to the time axis, namely, 116, 118, 120, 122 and 124. The uppermost line 124 represents the value of line pressure PL. The lowermost line 116, which passes through point 106, represents the pressure value in the chamber 82 at which the friction device has sufficient pressure to provide reaction during a downshift. This is the pressure to which the off-going friction device is held during the disengagement. This pressure is held long enough to ensure that speed change is complete before the off-going device is fully released. The line 118 passes through the point 96. This is the pressure value at which the on-coming friction device has sufficient torque capacity to establish the on-coming gear ratio.

The ratio between the on-coming and off-going gear ratios (R1/R2) is equal to the ratio of the pressures at points 96 and 106. The line 120 represents the pressure required or equal to the spring force (FS) divided by the area of the diameter 72. That would include the reactionaries of chambers 74 and 66 in the accumulator. The line 122 represents the amount of pressure above the line 118 which the spring force divided by the area of the end 64 represents. Thus, the line pressure PL 127 represents line pressure times area three (A3) divided by area one (A1). A3 is the area of the end 68, the bias end of the accumulator 16. The line 120 represents a pressure value equal to line pressure PL times area three (A3) divided by area two (A2). A2, of course, is the area of the accumulator during the downshift portion of the timing cycle. A1 is the area of the upshift portion of the accumulator during the timing cycle.

It should be evident that the ratio of the area two to area one is also equal to the ratio of the gear ratios before and after the interchange (A1/A2=R1/Rs). Since the accumulator more nearly matches the pressure requirements for the friction device during the off-going timing cycle, the shift transients are removed and the shift becomes much smoother and more pleasable to the operator. With the improved accumulator control, a more ideal pressure control for both the upshift and downshift occurs, and this will maintain the control throughout the required time interval that is necessary to complete the shift or the ratio interchange. This, of course, ensures the consistency and pleasability of the shift quality.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An accumulator and shift control apparatus comprising: a clutch means; a source of fluid pressure; shift control valve means for selectively operatively supplying pressurized fluid to said clutch means and exhausting fluid from said clutch means; and accumulator means disposed between the shift control valve means and the clutch means for controlling pressure change rate at the clutch means between first predetermined pressure limits during pressurizing of the clutch means for a predetermined time and between second predetermined pressure limits during exhausting of the clutch means for a predetermined time, said accumulator means comprising first chamber means subjected to pressure during both clutch means pressurization and exhaust, second chamber means subjected to pressure only during clutch means exhaust, and bias chamber means pressurized during clutch means pressurization and exhaust in opposition to pressure in the first chamber means during pressurization and in both the first and second chamber means during exhaust.

2. An accumulator and shift control apparatus comprising: a clutch means; a source of fluid pressure; shift control valve means for selectively operatively supplying pressurized fluid to said clutch means and exhausting fluid from said clutch means; accumulator means disposed between the shift control valve means and the clutch means for controlling pressure change rate at the clutch means between first predetermined pressure limits during pressurizing of the clutch means for a predetermined time and between second predetermined pressure limits during exhausting of the clutch means for a predetermined time, said accumulator means comprising first chamber means subjected to pressure during both clutch means pressurization and exhaust, second chamber means subjected to pressure only during clutch means exhaust, and bias chamber means pressurized during clutch means pressurization and exhaust in opposition to pressure in the first chamber means during pressurization and in both the first and second chamber means during exhaust; and spring means acting on said accumulator means in opposition to the pressure in the bias chamber means.

3. An accumulator and shift control apparatus comprising: a fluid operated friction means; a source of fluid pressure; shift control valve means for selectively operatively supplying pressurized fluid to said fluid operated friction means during the establishment of a first drive ratio (R1) and exhausting fluid from said fluid operated friction means during the establishing of a second drive ratio (R2); and accumulator means disposed between the shift control valve means and the fluid operated friction means for controlling pressure change rate at the fluid operated friction means between first predetermined pressure limits during pressurizing of the fluid operated friction means for a predetermined time and between second predetermined pressure limits during exhausting of the fluid operated friction means for a predetermined time, said accumulator means comprising first chamber means having an area (A1) subjected to pressure during both fluid operated friction means pressurization and exhaust, second chamber means having an area (A2) subjected to pressure only during fluid operated friction means exhaust, and bias chamber means pressurized during fluid operated friction means pressurization and exhaust in opposition to pressure in the first chamber means during pressurization and in both the first and second chamber means during exhaust, said areas (A1) (A2) having a ratio (A1/[(A1)+(A2)]) substantially equal to the ratio (R1)/(R2) of the drive ratios.

* * * * *